United States Patent [19]
Futerman

[11] Patent Number: 5,934,807
[45] Date of Patent: Aug. 10, 1999

[54] CONTAINER BAG

[75] Inventor: Charles Futerman, Stoke-On-Trent, United Kingdom

[73] Assignee: Mulox IBC Ltd., Stoke-On-Trent, United Kingdom

[21] Appl. No.: 08/998,801

[22] Filed: Dec. 29, 1997

Related U.S. Application Data

[63] Continuation of application No. 08/253,509, Jun. 3, 1994, abandoned.

[30] Foreign Application Priority Data

Jul. 3, 1993 [GB] United Kingdom ................... 9313802

[51] Int. Cl.$^6$ .................................................. B65D 30/04
[52] U.S. Cl. ............................ 383/105; 383/24; 383/117; 383/119
[58] Field of Search ................................. 383/105, 117, 383/119, 17, 24

[56] References Cited

U.S. PATENT DOCUMENTS

| | | | |
|---|---|---|---|
| 4,703,517 | 10/1987 | Marino | 383/119 X |
| 5,104,236 | 4/1992 | LaFleur | 383/105 X |
| 5,158,369 | 10/1992 | Derby | 383/119 X |
| 5,323,922 | 6/1994 | Lapoint, Jr. et al. | 383/119 X |
| 5,423,611 | 6/1995 | Sherrard | 383/119 X |
| 5,458,419 | 10/1995 | Trepte et al. | 383/117 X |

FOREIGN PATENT DOCUMENTS

| | | | |
|---|---|---|---|
| 3736859 | 5/1989 | Germany | 383/117 |
| 2224006 | 4/1990 | United Kingdom | 383/119 |

*Primary Examiner*—Jes F. Pascua
*Attorney, Agent, or Firm*—Kohn & Associates

[57] ABSTRACT

A container bag (10) having a base (14), side walls (12) and lifting loops (16) is characterized in that the central portions (15) of the side walls of the bag or of a liner within the bag are stiffened relative to the corner portions whereby to effect a squarer shape to the bag. The stiffening may be achieved by fabric from which the bag (or liner) is to be made being selectively stiffened in those areas destined to form the central wall portions by using different weave densities, more or additional threads of either the same or a different kind, additional layers of material being attached e.g., by adhesion in the relevant areas, or a stiffening coating composition e.g., of a polymer applied.

7 Claims, 6 Drawing Sheets

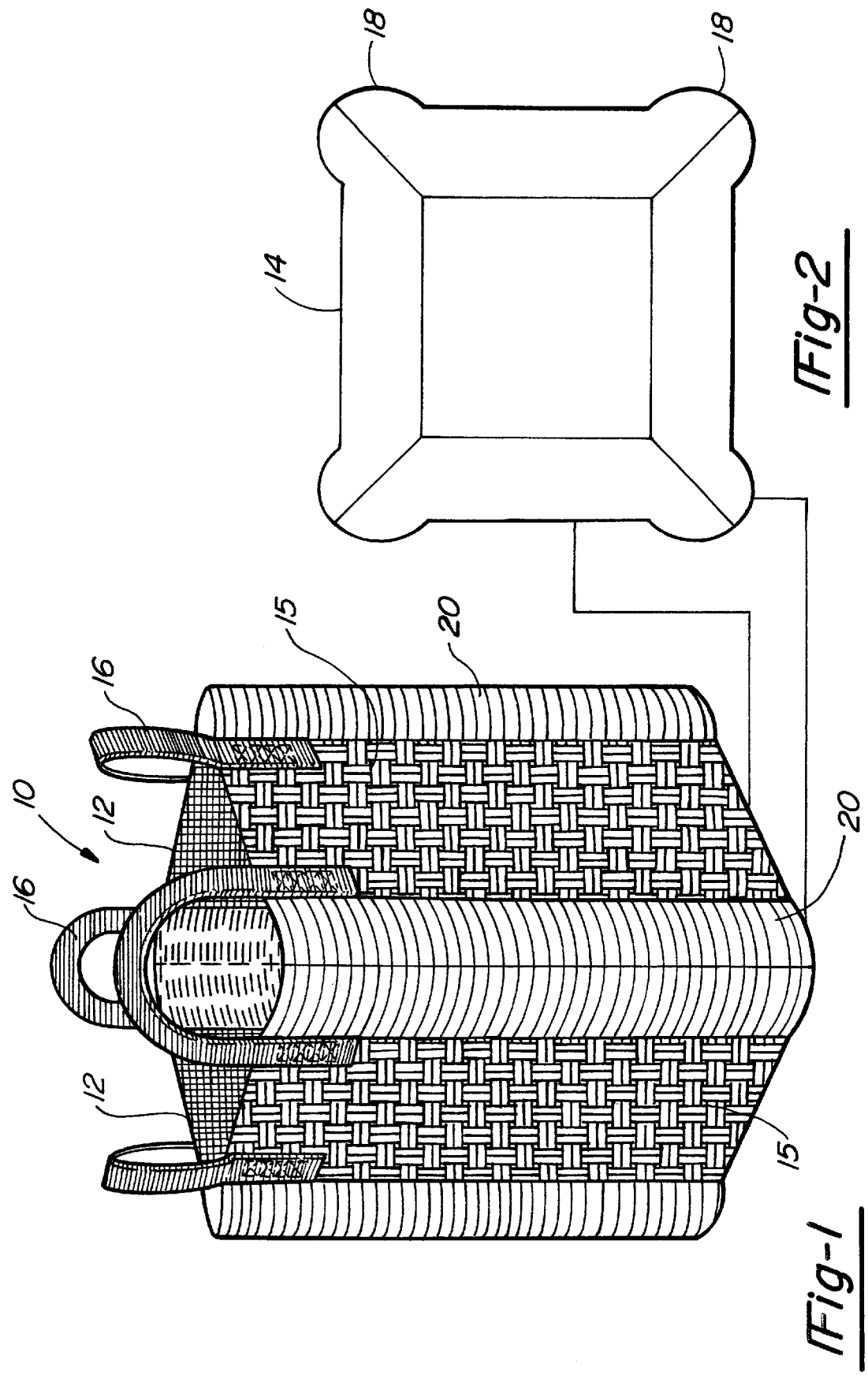

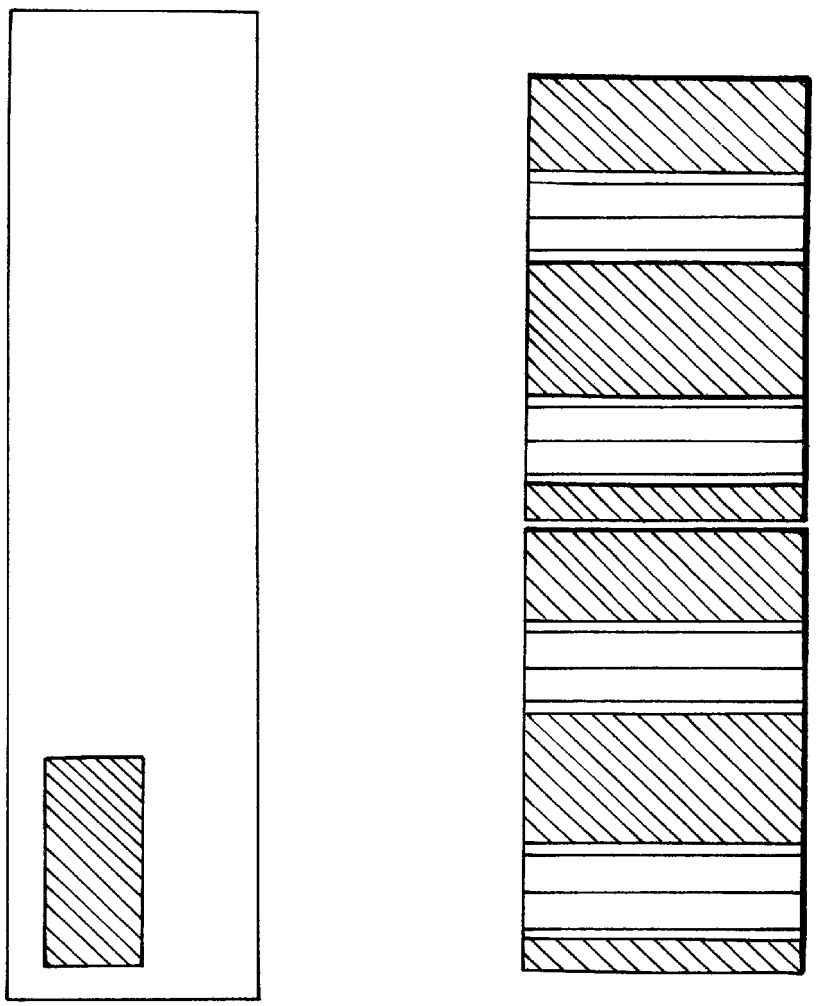
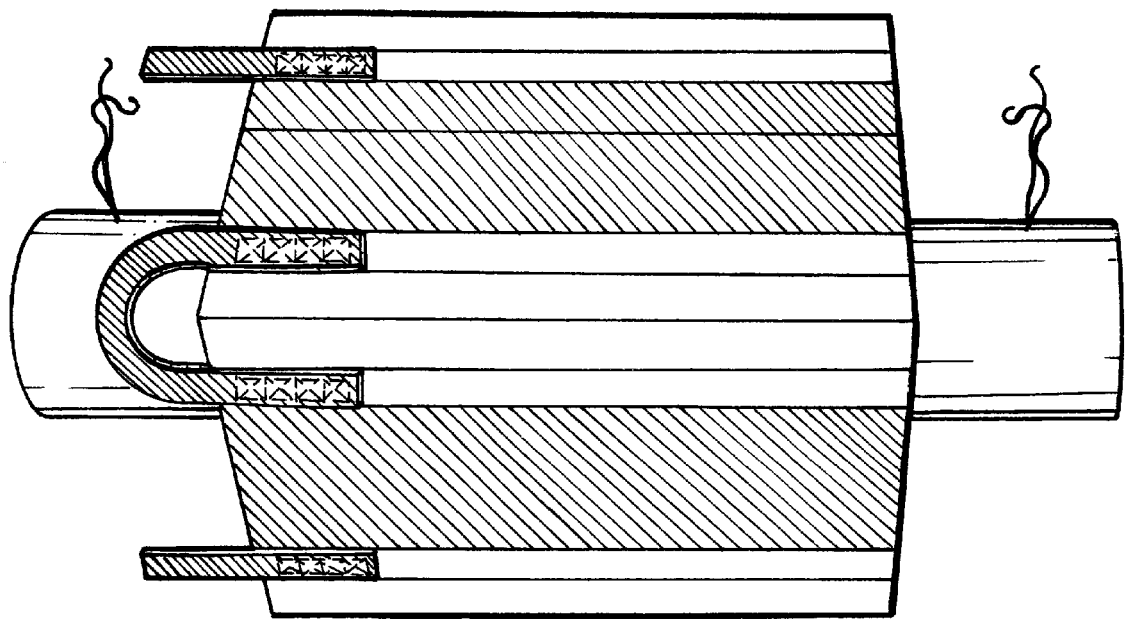
Fig-3

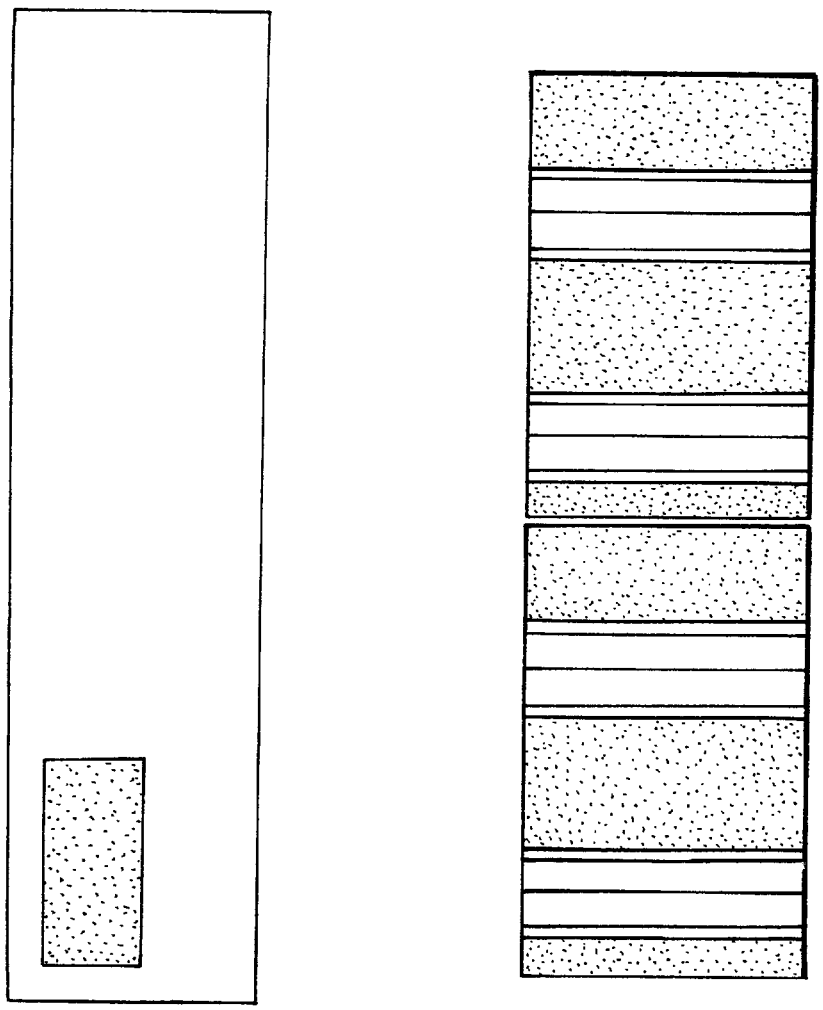
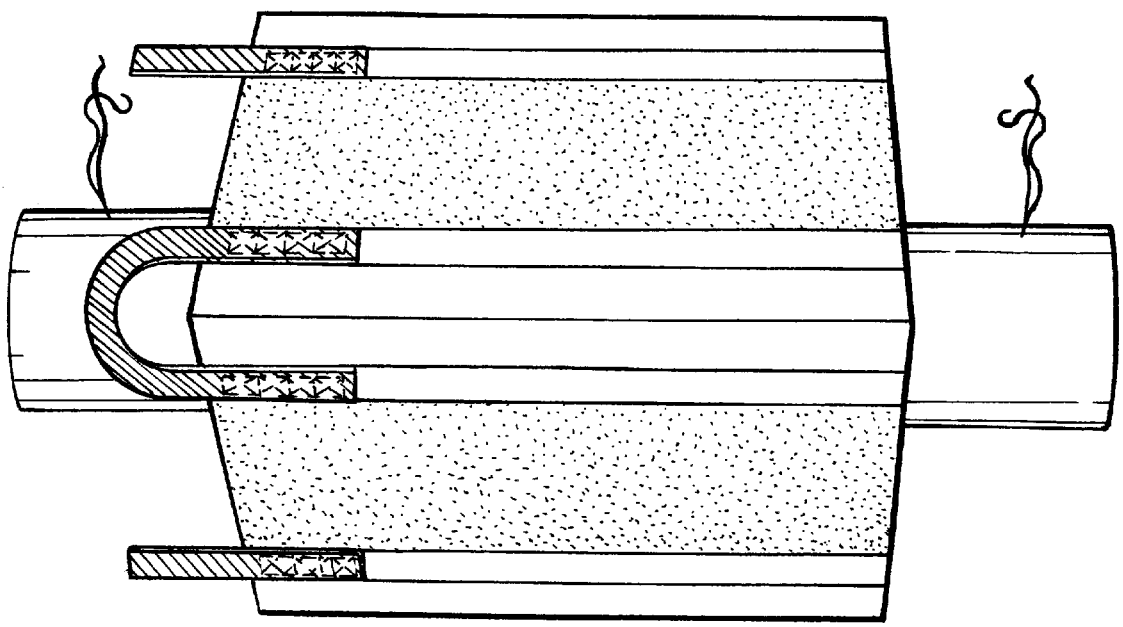
Fig-4

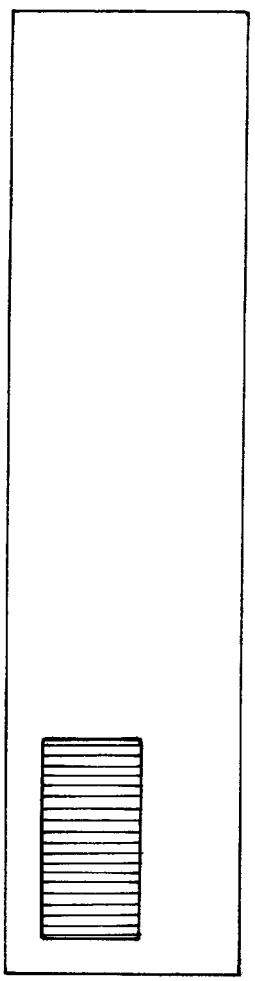
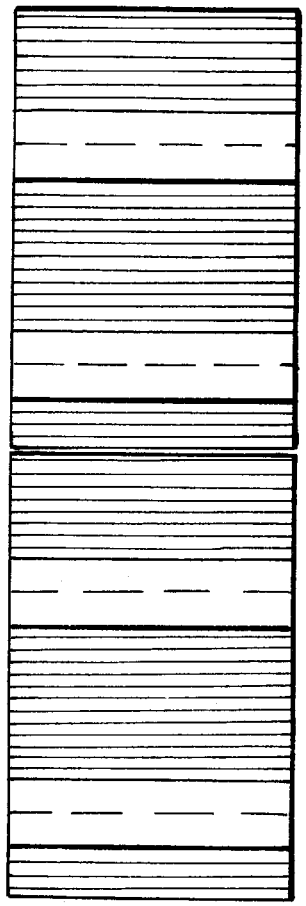
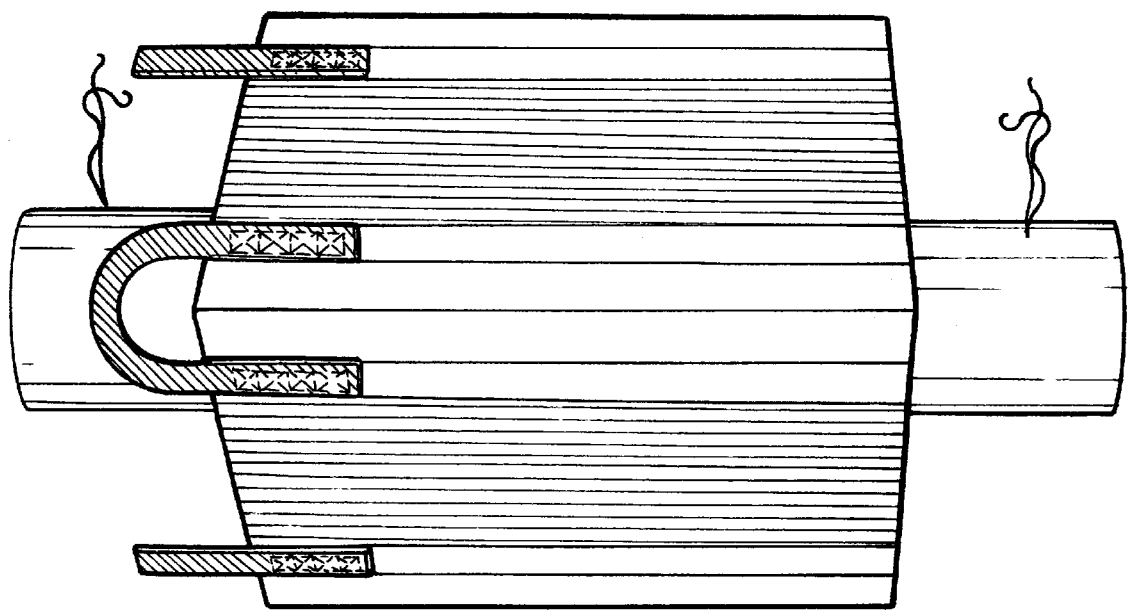
Fig-5

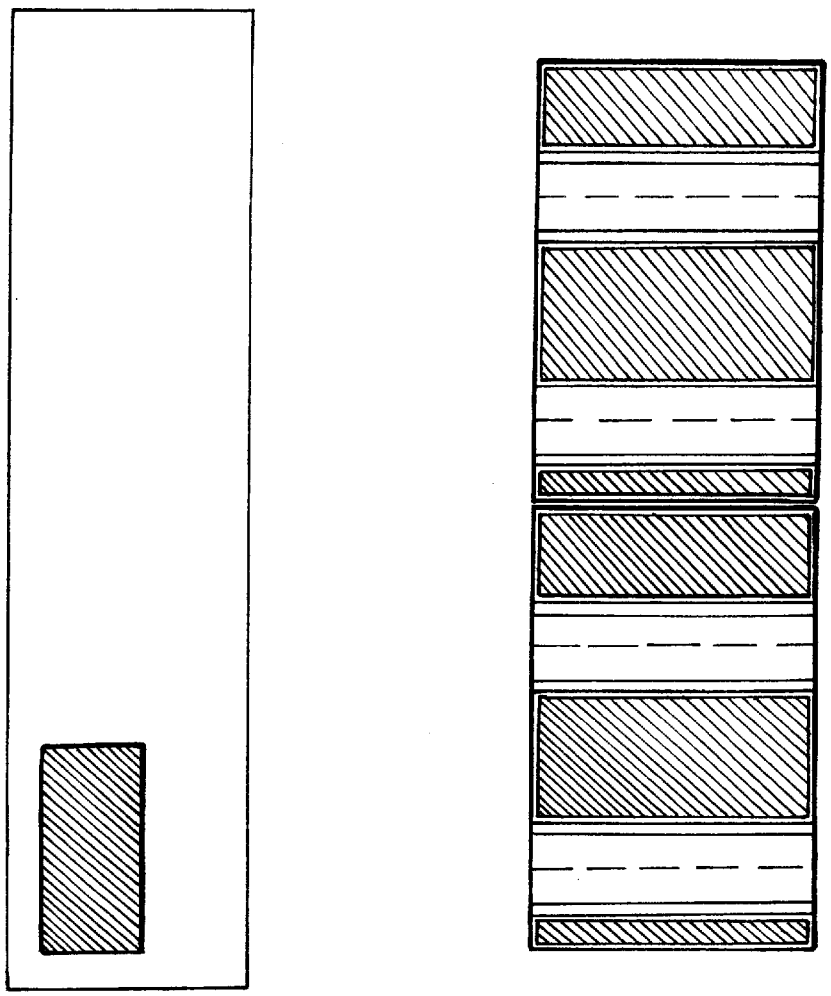
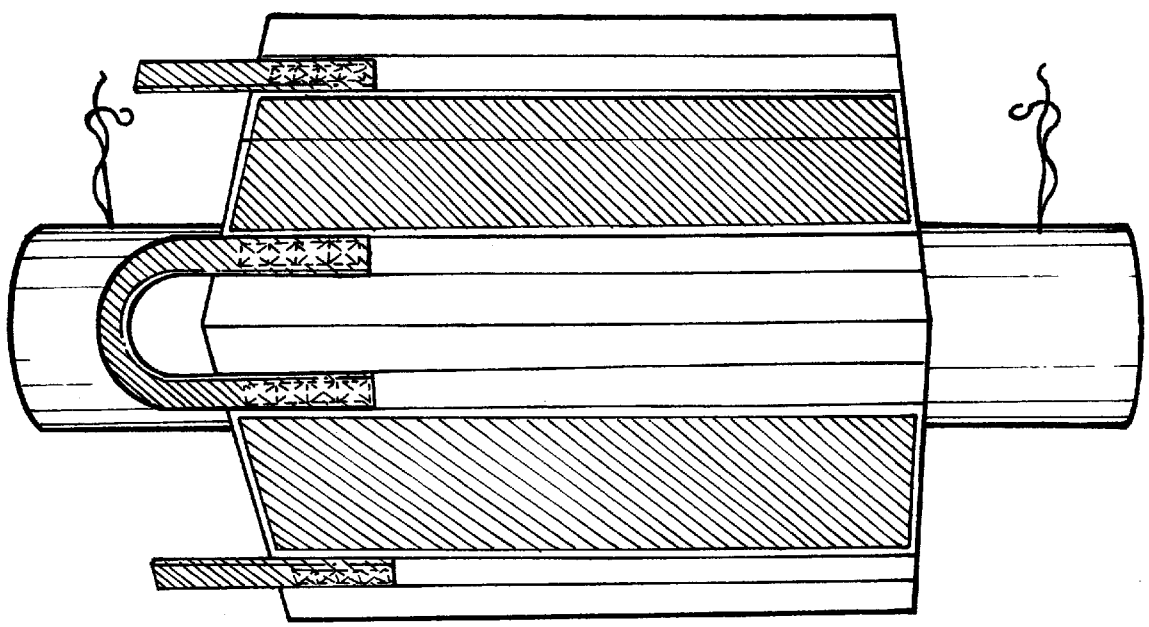
Fig-6

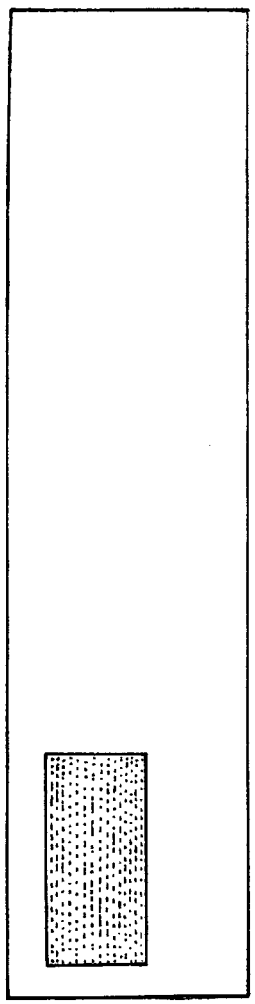
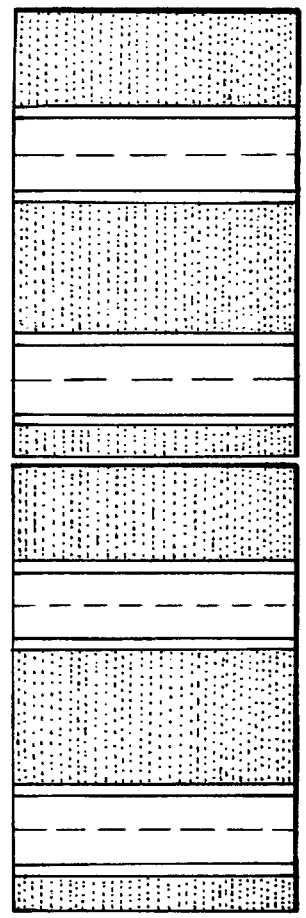
Fig-7
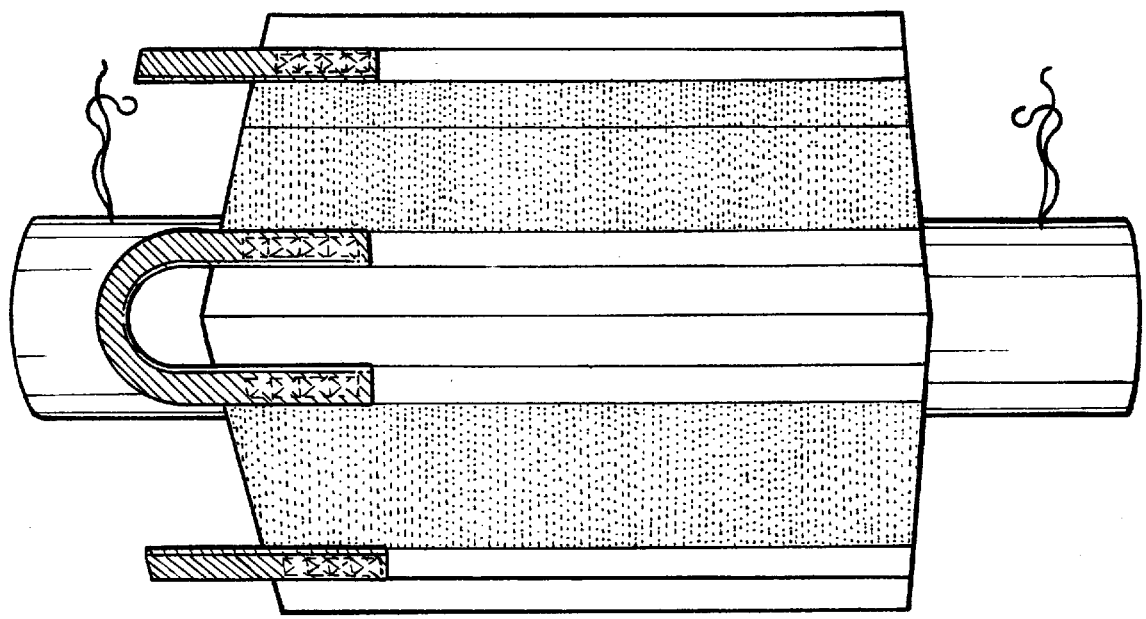

CONTAINER BAG

CROSS-REFERENCE TO RELATED APPLICATIONS

This application is a continuation of U.S. Pat. No. 08/253,509, filed Jun. 3, 1994, now abandoned, which claims priority from United Kingdom Application No. 9313802.2 filed Jul. 3, 1993.

GOVERNMENT SUPPORT

Not Applicable

BACKGROUND OF THE INVENTION

1. Field of the Invention

This invention relates to container bags and in particular relates to container bags for carrying loads in the range of one half to two tons and known as flexible intermediate bulk containers (FIBC's).

2. Description of Related Art

Flexible intermediate bulk containers are increasingly employed in cargo handling and transporting situations, especially for the carriage of particulate or pulverulent material. A typical FIBC will be manufactured from a fabric woven from a polyolefin tape and have integral lifting loops. Examples of such containers are described in UK patent numbers 1591091 and 2063816. FIBC's have to meet various national and international safety standards; for example, it is normal to require a five to one safety ratio, that is an IBC rated at one ton should not break under loads of less than five tons.

A recent trend in the FIBC field has been the increasing usage of FIBC's having a much squarer configuration for powdered, flaked or granular materials which do not form a stable package when filled into an FIBC. Examples include products with a low specific gravity. Other products tend to pack more firmly in a square cross-section. The square configuration also improves the packing of filled FIBC's in, for example, ISO containers, as well as improving stacking.

One proposal for obtaining an FIBC more square in plan view involves sewing baffles across the internal corners to hold the square shape. The baffles have holes in them to allow the product to flow into the corners. However, the provision of baffles of the required configuration and, in particular the extra sewing required, increases the cost of manufacture of these bags.

The invention seeks to provide a container bag improved in the above respect.

SUMMARY OF THE INVENTION

According to the present invention, there is provided a container bag having a base, side walls and lifting loops characterized in that the central portions of the side walls of the bag or of a liner within the bag are stiffened relative to the corner portions whereby to effect a squarer shape to the bag.

The stiffening may be achieved in several ways. The fabric from which the bag (or liner) is to be made may be selectively stiffened in those areas destined to form the central wall portions by using different weave densities, more or additional threads of either the same or a different kind, additional layers of material being attached e.g., by adhesion in the relevant areas, or a stiffening coating composition e.g., of a polymer applied. Since liners are normally made from extruded polyolefin sheet material, the latter two methods are likely to be more appropriate.

The invention is equally applicable to FIBC's having or not having a liner e.g., of polyethylene sheet or material. Stiffening of the side walls can be achieved by various means. For example, FIG. 3 shows a bag including side panels selectively stiffened to form the central wall portions by using more threads of the same kind. In the panel shown, most preferably 100% more threads of the same kind as used. FIG. 4 shows a further embodiment of the invention wherein more threads of a different kind as used, preferably 100% more threads of a different kind. FIG. 5 shows a further embodiment wherein the central portions are stiffened by using different threads of a different kind. FIG. 6 shows a further embodiment where the central wall portions are stiffened by using additional layers of material being attached by adhesion at the areas. FIG. 7 shows the side panels including central wall portions stiffened by a coding column position of a polymer applied.

The fabric from which the FIBC of the invention is formed may be a conventional fabric for use in this type of container and may be woven from polyethylene or polypropylene tape yarns or polyester coated yarns. The side walls of the container may be made from a fabric having reinforced zones or areas of interwoven reinforcing yarns for example, as disclosed in Applicant's UK patent number 1591091 to which the lifting loops will normally be attached. The lifting loops will preferably be of a woven webbing of synthetic yarns, for example, of the type used for car seat belts, for example, polypropylene, polyamide or polyester yarns, or may be ropes or hawsers of suitable strength.

Where the central portions of the side wall are stiffened by additional threads, particularly if the threads are of higher tenacity than those normally used in the body, the lifting loops can be attached to stiffened central portions.

The base of the FIBC of the invention may be square or, preferably, may have corners of increased radius as will be described more fully hereinafter, as may the liner if fitted.

The container bag of the invention may be fitted with a top and/or a filling spout, as well as a discharge spout, as is conventional in the FIBC art.

DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an FIBC of the invention;

FIG. 2 is a schematic plan view corresponding to FIG. 1.

FIG. 3 is a prospective view of an alternative embodiment of the present invention;

FIG. 4 is prospective view of a further embodiment of the present invention;

FIG. 5 is prospective view of a further embodiment of the present invention;

FIG. 6 is prospective view of a further embodiment of the present invention;

FIG. 7 is prospective view of a further embodiment of the present invention;

DETAILED DESCRIPTION OF THE INVENTION

Referring to the drawings, an FIBC generally designated 10 has side walls 12 and a base 14. The fabric from which the side walls and base are formed will generally be a woven polyolefin fabric which has been crammed (woven at a higher density) or has additional yarns in the portions 15 which correspond to the central portions of the made up bag 10. Lifting loops 16 are provided across each corner and are stitched to the edges of the central portions 15 of the respective side walls 12.

The base 14 preferably has corners 18 of greater radius giving the 'bulbous' appearance shown in FIG. 2.

The corner portions 20 of the bag body are of conventional fabric and are therefore more flexible than the areas 15. This ensures that the bag 10 maintains a square appearance in plan view giving the whole bag a very cubic shape.

The bag can be manufactured from four separate side panels, or two widths of fabric each giving two side panels, or one wide section of fabric giving all four sides 12. The bag 10 may also be produced from circular woven fabric with additional ends of yarn going into the portions 15 to make them stiffer.

Alternatively, a conventionally produced bag may be provided with a liner of the above described configuration, having stiffened areas between the corners thereof.

The FIBC of the invention provides a simple and economical solution to the problem of maintaining a square or cubic configuration of bag while keeping down manufacturing costs.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A container bag which consists of a base, side walls separated by corner portions interconnecting adjacent side walls and lifting loops interconnecting adjacent ones of said side walls characterized in that the entire side walls of the bag are stiffened relative to the corner portions thereby being the sole means for effecting a squarer shape to the bag, said bag including fabric of a first weave density from which the bag is to be made, said fabric being selectively stiffened in those areas forming said entire side walls by using different weave densities than said first weave density.

2. A container bag which consists of a base, side walls separated by corner portions interconnecting adjacent side walls and lifting loops interconnecting adjacent ones of said side walls characterized in that the entire side walls of the bag are stiffened relative to the corner portions thereby being the sole means for effecting a squarer shape to the bag, said base of the bag includes flat side edges separated by corners of increased radius giving the corners a bulbous appearance.

3. A container bag which consists of a base, side walls separated by corner portions interconnecting adjacent side walls and lifting loops interconnecting adjacent ones of said side walls characterized in that the entire side walls of the bag are stiffened relative to the corner portions thereby being the sole means for effecting a squarer shape to the bag, said bag including fabric made from a first number of threads from which the bag is to be made, said fabric being selectively stiffened in those areas forming said entire side walls by using more threads of the same kind than said first number of threads.

4. A container bag which consists of a base, side walls separated by corner portions interconnecting adjacent side walls and lifting loops interconnecting adjacent ones of said side walls characterized in that the entire side walls of the bag are stiffened relative to the corner portions thereby being the sole means for effecting a squarer shape to the bag, said bag fabric from which the bag is to be made, said fabric being selectively stiffened in those areas forming said entire side walls by using additional threads of the same kind.

5. A container bag which consists of a base, side walls separated by corner portions interconnecting adjacent side walls and lifting loops interconnecting adjacent ones of said side walls characterized in that the entire side walls of the bag are stiffened relative to the corner portions thereby being the sole means for effecting a squarer shape to the bag, said bag including fabric of threads of a specific kind which the bag is to be made, said fabric being selectively stiffened in those areas forming said entire side walls by using more threads of a different kind.

6. A container bag which consists of a base, side walls separated by corner portions interconnecting adjacent side walls and lifting loops interconnecting adjacent ones of said side walls characterized in that the entire side walls of the bag are stiffened relative to the corner portions thereby being the sole means for effecting a squarer shape to the bag, said bag including fabric made from a selected kind of thread from which the bag is to be made, said fabric being selectively stiffened in those areas forming said entire side walls by using additional threads of a different kind.

7. A container bag which consists of a base, side walls separated by corner portions interconnecting adjacent side walls and lifting loops interconnecting adjacent ones of said side walls characterized in that the entire side walls of the bag are stiffened relative to the corner portions thereby being the sole means for effecting a squarer shape to the bag, said bag including fabric from which the bag is to be made, said fabric being selectively stiffened forming said entire side walls by using a stiffening coating composition of a polymer applied thereto.

* * * * *